Patented June 4, 1935

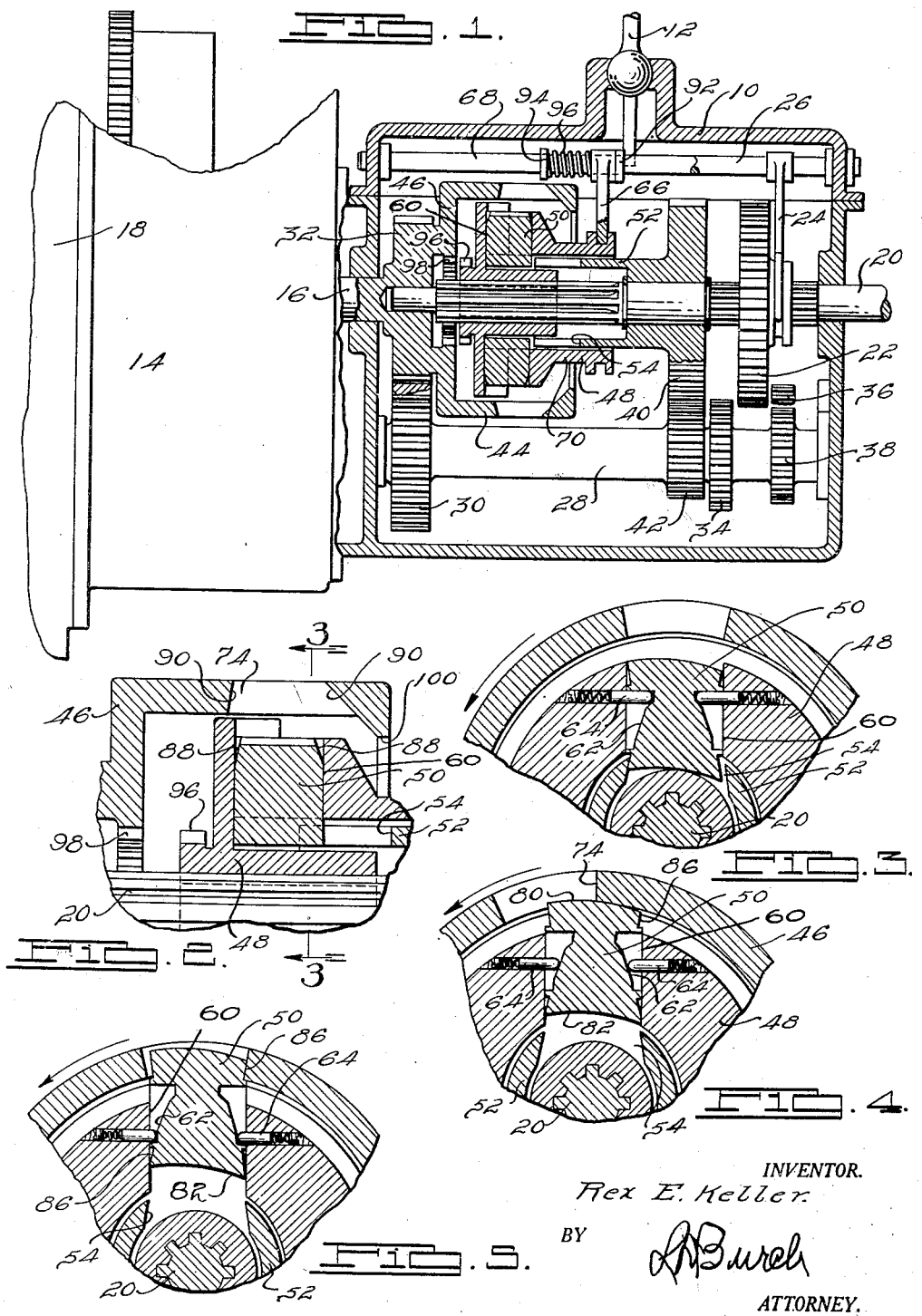

2,003,634

UNITED STATES PATENT OFFICE 2,003,634

AUTOMATIC TRANSMISSION

Rex E. Keller, Beverly Hills, Calif.

Application February 26, 1934, Serial No. 713,028

9 Claims. (Cl. 74—336)

This invention relates to automatic transmissions and particularly to automatically variable change speed power transmitting mechanisms adapted for use in automotive vehicles.

The invention contemplates the provision in a change speed gearing mechanism of means for automatically changing the gear ratio responsive to certain conditions of operation of the vehicle in which such a device may be incorporated.

For the purpose of illustrating the invention, there is disclosed in the accompanying sheet of drawings a change speed transmission having a shaft adapted to be driven by the engine of the vehicle in which the device is incorporated, a shaft adapted to be operatively connected to the road wheels of the vehicle for driving the same, a countershaft gear cluster cooperating with gears on the driving and driven shafts for providing different ratio driving connections between said shafts, and a single centrifugal clutch unit operable responsive to centrifugal force for effecting changes in the gear ratio with manually operable means whereby selective changes in the gear ratio may be effected without regard to the condition of operation of the vehicle.

A principal object of the invention is to provide an automatic transmission which is extremely simple in design and which may be operated either automatically or selectively for effecting changes in the gear ratio between the driving and driven shafts to meet practically all conditions of operation to which a vehicle may be subjected.

Another object of the invention is to provide in a variable speed transmission means whereby the automatic changes in the gear ratio may be effected under the control of the operator of the vehicle.

Another object of the invention is to provide an automatic transmission of the positive locking type in which the use of free wheeling or over-running clutches is unnecessary.

Other objects and advantages will be apparent from the following specification taken in conjunction with the accompanying drawing of which there is one sheet and in which:

Fig. 1 is a side elevational view, partly in section, of a variable speed power transmitting mechanism embracing my invention and showing the same as applied to an automotive vehicle;

Fig. 2 is an enlarged sectional view of the automatic clutch unit and showing the same in automatic position; and Figs. 3, 4 and 5 are cross sectional views taken in the plane on the line 3—3 of Fig. 2 and illustrating the various positions of the locking bolt.

Referring now to Fig. 1 of the drawing, there is shown a change speed gearing indicated generally at 10 having manually operable shift lever 12 whereby selective changes in the gear ratio may be effected by the operator of the vehicle and which mechanism is behind a clutch mechanism 14 by means of which the driving shaft 16 of the transmission mechanism may be connected to the engine of the vehicle indicated generally at 18. A driven shaft 20, adapted to be operatively connected to the road wheels of the vehicle, is journaled at its forward end in a counterbore provided in the rearward end of the driving shaft 16 and has slidably splined thereto a gear 22 which is adapted to be moved by a fork or yoke 24 carried by a shifter rod 26 which may be moved axially by means of the manual shift lever 12. A countershaft gear cluster 28 is provided with a constant mesh gear 30 mating with a gear 32 which is fixed to the driving shaft 16 for driving the gear cluster with the driving shaft. The gear 22 is movable to the left, looking at Fig. 1, to mate with gear 34 of the gear cluster to provide a positive low speed driving connection between the driving and the driven shafts and is movable to the right, looking at Fig. 1, to mate with an idler gear 36 which is in constant mesh with gear 38 of the gear cluster to provide a reverse driving connection between the driving and the driven shafts. A gear 40, freely rotatable on the driven shaft 20 but secured against lateral displacement thereon, is in constant mesh with a gear 42 of the gear cluster 28 and is adapted to be locked to the driven shaft 20 for the purpose of providing an intermediate speed driving connection between the driving and the driven shafts.

Disposed between the gears 32 and 40 an automatic clutching mechanism 44 is provided which includes a drum-shaped clutch member 46 fixed to the driving shaft 16 to rotate therewith, a core clutch member 48, slidably splined to the driven shaft 20 and nested within the drum-shaped clutch member, and one or more radially movable bolts 50 carried by the core clutch member and operable responsive to changes in centrifugal force above and below certain amount for positive locking engagement with a portion of the drum-shaped clutch member 46 and with a clutch sleeve 52 provided on the intermediate speed gear 40. The clutch sleeve 52 is bifurcated at the open end thereof to provide a pair of slotted openings 54 into which the bolt 50 is extensible under certain conditions of operation for locking the clutch core 48 to the intermediate speed gear 40 for rotation therewith whereby a positive two-way driving connection between the driving and the driven shafts will be provided through the intermediary of gears 32, 30, 42 and 40, sleeve 52, bolt 50 and clutch core 48, which is slidably splined to the driven shaft 20.

In Fig. 3 the bolt 50 is shown projecting into the slotted opening 54 in the clutch sleeve 52.

The clutch core 48 is provided with a pair of holes 60 of rectangular cross section in which the bolts 50 are slidably mounted, the same returning to the position in which they are shown in Fig. 1 of the drawing when the mechanism is at rest. The bolts 50, in general, are rectangular in cross section and intermediate the ends thereof and along the sides are provided with tapered grooves 62 into each of which a spring-pressed poppet 64, carried by the clutch core 48, extends and which poppets 64 engage with the ends of the grooves 62 for limiting the travel of the bolts 50 in both directions. The groove 62 is tapered from one end thereof to the other so that the pressure of the spring-pressed poppets 64 tends to return the bolts 50 to the position in which they are shown in Fig. 3 of the drawing. It will be appreciated that before the bolts 50 may be moved radially outwardly from the position in which they are shown in Fig. 3 of the drawing, that the centrifugal force of the bolts must be sufficient to overcome the force of the spring-pressed poppets 64 bearing against the tapered groove 62 in the sides of the bolts 50. It will also be appreciated that when the bolts are in the position shown in Fig. 5 of the drawing that before the spring-pressed poppets 64 can return the bolts to the position shown in Fig. 3, or to their retracted position, the centrifugal force of the bolt 50 will have to fall below that force exerted by the spring-pressed poppets on the bolt 50 and tending to move the same inwardly.

It will be noted that the taper of the groove 62 changes so that in the case where the bolt is in the position shown in Fig. 5, or in the projected position, as soon as the bolt begins to move, the pitch of the tapered surface of the groove 62 increases so that the poppets 64 will exert a greater force on the bolt 50 tending to move the same inwardly, and in the case where the bolt 50 is in the position shown in Fig. 3 of the drawing, as soon as the bolt 50 begins to move out of such position, the pitch on the tapered surface of the groove 62 is decreased so that less resistance on the part of the spring-pressed poppet 64 is offered to the radial outward movement of the bolt 50 under the action of centrifugal force. This construction enables the bolt to move from one of its positions to the other with a quick snappy action, which will prevent the bolt from being caught midway between its extreme positions, as a result of which it might be damaged by the shearing force that at such time would be applied to the bolt 50.

When the transmission is set for neutral, the parts thereof are in the position shown in Fig. 1 of the drawing, at which time the clutch core 48, while it is connected to the driven shaft 20, is not operatively connected to either the drum-shaped clutch member or to the intermediate speed gear 40. Manipulation of the manual shift lever 12, however, is adapted, through the instrumentality of yoke 66 connected to the shifted rod 68 which is engageable by the shift lever 12 and which yoke is connected to the hub portion 70 of the clutch core 48 for shifting the same, to shift the clutch core 48 to the right, looking at Fig. 1, to a position where the bolt 50 will underlie the path of rotation of a pair of slotted openings 74 provided in the drum-shaped clutch member 46, such position being illustrated in Fig. 2 of the drawing.

Movement of the clutch core 48 to such position will move the inside ends of the bolt 50 into the grooves 54 provided by the bifurcated end of the sleeve 52 for operatively connecting the gear 40 to the driven shaft 20 through the sleeve 52, bolt 50 and the core 48, which is slidably splined to the driven shaft 20. This will provide a positive reduced speed driving connection between the driving and driven shafts, as a result of which the drum-shaped clutch member 46 will rotate at a rate of speed in excess of the core clutch member 48 and in the direction indicated by the arrow in Figs. 3, 4 and 5. The core clutch member 48 will, however, rotate with the driven shaft 20, and the bolt 50 will, due to the centrifugal force thereof resulting from rotation of the core clutch member 48, tend to fly outwardly. Since the bolts 50 at such time connect the sleeve 52 to the clutch core 48, they cannot move outwardly under the influence of centrifugal force unless the torque between the sleeve 52 and the clutch core 48 is released, which may be accomplished by the closing of the throttle controlling the speed of the engine. Assuming that such is done, bolt 50 will move to a position such as that illustrated in Fig. 4 of the drawing to break the connection between the sleeve 52 and the clutch core 48, where the bolts will remain until they are projected outwardly into the slotted openings 74 provided in the drum-shaped clutch member 46.

On account of the fact that the clutch core member 46 at such time is rotating at a faster rate than the clutch core 48, the bolts 50 will not move into the slotted openings 74 until the rotative speed of the clutch drum 46 is reduced to approximately that of the core 48. The head of the bolt 50 is provided with a beveled surface 80 which will cause the bolt 50 to jump the slotted openings 74 until the rotative speeds of the two clutch members are approximately synchronous, when the slotted openings 74 will line up with the bolt 50 for a sufficient length of time to enable the bolt 50 to move outwardly into the slotted openings, the spring-pressed poppets 64 limiting the outward movement of the bolt 50. The bevel 80 provided on the head of the bolt 50 is such that the bolt 50 will ratchet over the openings 74 as long as there is any substantial difference in the rotative speeds of the clutch members 46 and 48.

The opposite end of the bolt is provided with a similar bevel 82 which comes into operation upon changing from a direct drive to a reduced drive and upon movement of the bolt inwardly out of the slotted opening 74. After the bolts 50 leave the slotted opening 74 and move inwardly, they are returned to the position shown in Fig. 3 of the drawing, but it will be appreciated that since the bolts 50 and clutch core 48 have been rotating with the clutch drum 46 and at the same rate of speed as the driving shaft 16 and since the sleeve 52 connected to the gear 40 is rotating at a slower rate of speed since it is driven through the train of gears, that the bolts 50 if they suddenly dropped into the openings 54 provided by the bifurcated end of the sleeve 52 would cause a sudden change in the gear ratio, the bevel surface 82 on the inside head of the bolt 50 is provided which will cause the bolt 50 to jump the openings 54 until the rotative speed of the core 38 is reduced to approximately that of the sleeve 52, whereupon the spring-pressed poppets 64 will cause the bolt 50 to drop into the slotted openings 54, thereby connecting the driven shaft 20 to be driven by the intermediate speed gear 40. The sides of the bolt 50 adjacent the ends thereof are provided with undercut bevels 86 which tend to lock the bolt to the driving clutch element either drum clutch member 46 or sleeve 52 to which the bolt at such time is connected, for the purpose of preventing the bolt from moving out of engagement with said clutch element in the event that torque between the parts temporarily is released at or near the speed at which the bolt is movable from one of its positions to the other.

The front and rear faces of the bolt 50 are provided with beveled surfaces 88, which are adpated to cooperate with like beveled surfaces 90 on the clutch drum 46 on the front and rear sides of the slotted openings 74 for the purpose of thrusting the bolt 50 to a retracted position, assuming that at such time the bolt is in engagement with the slotted openings to disconnect the clutch core 48 from the clutch drum 46. The yoke 66 carried by shifter rod 68 is confined between a stop 92 and a collar 94 by spring 96 which provides a lost motion connection between the shifter rod 68 and yoke 66. When the clutch core 48 is shifted from the position in which it is shown in Fig. 2, assuming that the bolts 50 were in their outer position, the co-acting beveled surfaces 88 and 90 on the bolt 50 and the clutch drum 46 would cam the bolt 50 out of the slotted openings, whereby the clutch members 46 and 48 would be disconnected and the transmission would be in neutral. Further movement of the clutch core 48 to the left from the position in which it is shown in Fig. 1 of the drawing will mate teeth 96 on the core with teeth 98 internally provided on the clutch member 46 for the purpose of providing a locked-up positive driving connection between the driving and the driven shafts whereby the driven shaft will be driven from the driving shaft until the shift lever 12 is manipulated to select a different position of the clutch core 48.

Again assuming that the bolt 50 is in its outer position and the parts are otherwise as shown in Fig. 2, movement of the clutch core 48 to the right will cause the co-acting beveled surfaces 88 and 90 on the bolt 50 and the clutch drum 46 to cam the bolt 50 out of the slotted openings 74, whereupon the bolt will assume the position approximately like that illustrated in Fig. 4. As soon as the bolt 50 is moved out of the slotted openings 74, the direct driving connection between the shafts will be broken and the clutch core which rotates with the driven shaft will decelerate to the speed of rotation of the intermediate speed gear 40 when, if pressure is applied to the clutch core 48 to continue the movement of the same to the right, the bolt 50 will, when synchronization of the core 48 and the sleeve 52 occurs, drop into the slotted openings 54, whereupon the transmission will be set for a locked-up drive in intermediate speed and the bolt 50 will be confined under the rim 100 of the clutch drum 46. The lost motion connection between the shifter rod 68 and the yoke 66 permits the core 48 to be shifted to the right when synchronization between the same and the sleeve 52 occurs which otherwise would be quite difficult to accomplish.

While several specific embodiments of the invention have been illustrated and described, it must be appreciated that many modifications may be made in the construction thereof without departing from the scope of the invention, and for that reason I do not desire to be limited to any particular form or arrangement except in so far as such limitations are included in the following claims:

1. In a variable speed transmission, the combination of two clutch elements driven from a common source and adapted to be rotated at different rates with a driven shaft adapted to be connected to either of said clutch elements, a clutch core member connected for rotation with said driven shaft, each of said clutch elements being provided with a slotted opening, a centrifugally operable bolt carried by said clutch core member and normally engageable with the slotted opening in the slower rotating of said clutch elements for connecting said driven shaft to the same to be driven thereby, said centrifugally operable bolt being movable subsequent to the attainment of a predetermined speed of rotation by said clutch core to extend into said slotted opening provided in the faster rotating of said clutch element and being provided with means for preventing the movement of said bolt into the slotted opening in the faster rotating of said clutch elements until the rotative speeds of said last mentioned clutch element and said clutch core are substantially synchronous, said centrifugally operable bolt being movable out of engagement with the said slotted opening in the slower rotating of said clutch elements upon moving in to the slotted opening in the faster rotating of said clutch elements.

2. Transmission mechanism having in combination a pair of drum-shaped driving clutch elements telescopically disposed with respect to each other and adapted to be driven from a common source and at different rates of rotation, a driven shaft adapted to be operatively connected to said clutch elements to be driven thereby and having a core clutch member rotatable therewith, a slotted opening in each of said driving clutch elements, a centrifugally operable bolt carried by said core clutch member movable into said slotted openings for connecting said core clutch member to said driving clutch elements for driving said driven shaft at different rates of speed, spring means biasing said bolt normally into one of said slotted openings and resisting movement of said bolt under the action of centrifugal force into the other of said slotted openings, and cam means on said bolt for preventing movement thereof into either of said slotted openings until the rotative speed of said core clutch member is synchronized with the driving clutch element into the slotted opening of which said bolt is about to be moved.

3. In a variable speed power transmitting mechanism, the combination of a pair of driving clutch elements driven from a common source and rotating at different rates of speeds, with a driven shaft adapted to be connected to said driving clutch elements to be driven at different rates thereby, a core clutch member mounted on said driven shaft and for rotation therewith, each of said driving clutch elements being provided with a slotted opening, a slidable bolt carried by said core clutch member and movable into said slotted openings for connecting said core clutch member to said driving clutch elements, spring means biasing said bolt normally into one of said slotted openings and resisting movement of said bolt under the action of centrifugal force into the other of said slotted openings, cam means on said bolt for preventing the movement thereof into either of said slotted openings until the rotative speed of said clutch core member is synchronized with that of the said driving clutch element into the slotted opening of which said bolt is about to be moved, and manually operable means for shifting said clutch core to a position where said bolt is rendered inoperative.

4. In a variable speed transmission, the combination of two driving clutch elements driven from a common source and rotating at different rates of speed with a driven shaft adapted to be connected thereto to be driven thereby at different rates, a core clutch member rotatable with said driven shaft and having a bolt operable responsive to changes in centrifugal force above and below predetermined amounts, a slotted opening in each of said clutch elements and adapted to receive said bolt for connecting said core clutch member to said clutch elements, cam means on said bolt for preventing the movement thereof into said slotted openings until the rotative speed of said core clutch member is synchronized with that of said driving clutch element into the slotted opening of which said bolt is about to be moved, and spring means biasing said bolt into one of said slotted openings for providing an initial driving connection between one of said clutch elements and said driven shaft, said bolt being movable out of one of said slotted openings upon moving into the other of said slotted openings.

5. Transmission mechanism having a driving shaft and a driven shaft with a drum-shaped driving clutch member fixed to rotate with said driving shaft, a gear rotatably mounted on said driven shaft and connected to a train of gears with said driving shaft, said gear being provided with a clutch element having a slotted opening therein, a slotted opening in said driving shaft clutch element, a slidable clutch member affixed to said driven shaft and having a centrifugally operable bolt extensible into either of said slotted openings for connecting said clutch member to either of said clutch elements, means for moving said clutch member to move said bolt into one of said slotted openings whereby said driven shaft will be driven by one of said driving clutch elements, said bolt being operable responsive to centrifugal force for moving out of said slotted opening and into the said slotted opening in the other of said driving clutch elements to connect said driven shaft thereto to be driven thereby, spring means resisting the movement of said bolt under the action of centrifugal force until the rotative speed of said clutch member attains a predetermined rate and operable for biasing said bolt into one of said slotted openings, and cam means on said bolt for preventing the movement thereof under the action of centrifugal force or of said spring means into either of said slotted openings until the rotative speed of said clutch member is synchronized with that of the driving clutch element into the slotted opening of which said bolt is being moved.

6. Transmission mechanism having in combination driving and driven shafts with a pair of positive driving clutch elements driven from said driving shaft and rotating at different rates of speed, a driven clutch member operatively connected to said driven shaft and having a centrifugally operable positive locking bolt cooperable with each of said positive driving clutch elements for providing a positive connection between each of the same and said driven shaft respectively, spring means biasing said locking bolt into positive locking engagement with one of said driving clutch elements for initially driving said driven shaft and operable for resisting the operation of said bolt under the action of centrifugal force until the rotative speeds of said driven clutch member attains a predetermined rate, said bolt being operable responsive to variations in centrifugal force progressively to disengage from one of said positive driving clutch elements and to engage the other of said positive driving clutch elements, and cam means provided on said bolt for preventing the engagement thereof with a driving clutch element until the rotative speeds of the same and said clutch member are approximately synchronous.

7. Transmission mechanism including in combination a driving shaft having a pair of driving clutch elements operatively connected thereto to be driven thereby at different rates with a driven shaft having a driven clutch member slidably splined thereto, a positive locking bolt on said driven clutch member and operable responsive to variations in centrifugal force resulting from rotation thereof for alternately connecting the same to said driving clutch elements, resilient means biasing said bolt into positive locking engagement with one of said driving clutch elements for initially driving said driven shaft and opposing the operation of said bolt under the action of centrifugal force, and manipulative means for shifting said driven clutch member to selectively connect the same to either of said driving clutch elements for locking said bolt against operation responsive to centrifugal force.

8. Transmission mechanism including in combination a driving shaft having a pair of driving clutch elements operatively connected thereto to be driven thereby at different rates, with a driven shaft having a driven clutch member slidably splined thereto, a positive locking bolt on said driven clutch member and operable responsive to variations in centrifugal force resulting from rotation thereof for alternately connecting the same to said driving clutch element, resilient means biasing said bolt into positive locking engagement with one of said driving clutch elements for initially driving said driven shaft and opposing the operation of said bolt under the action of centrifugal force, cooperating cam surfaces on said bolt and on the other of said driving clutch elements and cooperable upon relative axial displacement of said driven clutch member to retract said bolt for moving the same out of positive locking engagement with said last mentioned driving clutch element, and manipulative means for shifting said driven clutch member progressively to retract said bolt and to connect said driven clutch member selectively to either of said driving clutch elements for locking said bolt against operation responsive to centrifugal force.

9. Transmission mechanism including in combination a driving shaft having a pair of driving clutch elements operatively connected thereto to be driven thereby at different rates, with a driven shaft having a driven clutch member slidably splined thereto, a positive locking bolt on said driven clutch member positively engageable with said driving clutch element for connecting said driven shaft thereto and operable responsive to variations in centrifugal force resulting from rotation of said driven clutch member for progressively disengaging from one of said driving clutch elements and engaging the other of said driving clutch elements, resilient means biasing said bolt into positive locking engagement with one of said driving clutch elements for initially driving said driven shaft and opposing the operation of said bolt under the action of centrifugal force, cooperating cam surfaces on said bolt and on the other of said driving clutch elements and cooperable upon relative axial displacement of said driven clutch member to retract said bolt for moving the same out of positive locking engagement with said last mentioned driving clutch element, means on said bolt for preventing the engagement thereof with a driving clutch element until the rotative speeds of the same and said clutch member are substantially synchronous, and manipulative means for shifting said driven clutch member progressively to retract said bolt and to connect said driven clutch member selectively to either of said driving clutch elements for locking said bolt against operation responsive to centrifugal force.

REX E. KELLER.